United States Patent
Chung et al.

(10) Patent No.: US 7,278,035 B2
(45) Date of Patent: Oct. 2, 2007

(54) SYSTEM AND METHOD OF REAL-TIME POWER MANAGEMENT UTILIZING SIDEBAND PINS THAT ARE DEDICATED TO CONNECT FOR TRANSMITTING SIDEBAND SIGNAL DIRECTLY WITHOUT SOFTWARE CONTROL

(75) Inventors: Chien-Ping Chung, XinZhuang (TW); Chung-Ching Huang, XinZhuang (TW); Jing-Rung Wang, Taipei (TW)

(73) Assignee: Via Technologies, Inc., Taipei (TW)

( * ) Notice: Subject to any disclaimer, the term of this patent is extended or adjusted under 35 U.S.C. 154(b) by 474 days.

(21) Appl. No.: 10/939,573

(22) Filed: Sep. 13, 2004

(65) Prior Publication Data

US 2005/0289369 A1    Dec. 29, 2005

(30) Foreign Application Priority Data

Jun. 25, 2004   (TW) ............................... 93118499 A

(51) Int. Cl.
*G06F 1/00* (2006.01)
*G06F 1/32* (2006.01)

(52) U.S. Cl. ................ 713/300; 713/310; 713/320

(58) Field of Classification Search ............... 713/300, 713/320, 310

See application file for complete search history.

(56) References Cited

U.S. PATENT DOCUMENTS

| | | | | |
|---|---|---|---|---|
| 5,910,930 A | * | 6/1999 | Dieffenderfer et al. | 368/156 |
| 6,584,571 B1 | * | 6/2003 | Fung | 713/310 |
| 6,988,211 B2 | * | 1/2006 | Cline et al. | 713/300 |
| 7,085,943 B2 | * | 8/2006 | Chun et al. | 713/300 |

OTHER PUBLICATIONS

Xu et al, Computer system with power management and its method, Apr. 28, 2004, esp@cenet database, abstract of China patent application publication, pp. 1.*

* cited by examiner

*Primary Examiner*—Suresh K Suryawanshi
(74) *Attorney, Agent, or Firm*—Thomas, Kayden, Horstemeyer & Risley

(57) ABSTRACT

A system and method of real-time power management for use in computer systems. The system utilization is assessed by a North bridge, and a result is transferred to a South bridge. Thereafter, through transmitting sideband signals to a voltage controller and a frequency controller by sideband pins, the North Bridge provides faster and more efficient power management performance than the system management bus (SMBUS).

15 Claims, 7 Drawing Sheets

| Utilization | GPOa | GPOb | GPOc |
|---|---|---|---|
| HIGHEST | High | High | High |
| NORMAL | Low | High | High |
| LOW | Low | High | High |
| LOWEST | Low | Low | High |
| ... | ... | ... | ... |

Code table

| GPOa | GPOb | GPOc | Frequency |
|------|------|------|-----------|
| High | High | High | Over 10% |
| Low  | High | High | +/- 0% |
| High | Low  | High | Under 10% |
| Low  | Low  | High | Under 20% |
| ...  | ...  | ...  | ... |

Frequency table

FIG. 4

| GPOa | GPOb | GPOc | Voltage |
|------|------|------|---------|
| High | High | High | Over10% |
| Low  | High | High | +/- 0%  |
| High | Low  | High | Under 10% |
| Low  | Low  | High | Under20% |
| . .  | . .  | . .  | . .     |

Voltage table

FIG. 5

SYSTEM AND METHOD OF REAL-TIME POWER MANAGEMENT UTILIZING SIDEBAND PINS THAT ARE DEDICATED TO CONNECT FOR TRANSMITTING SIDEBAND SIGNAL DIRECTLY WITHOUT SOFTWARE CONTROL

BACKGROUND

The present invention relates to a power management method, and in particular, to a system and method for performing power management automatically without software protocols.

Regulation of power consumption is an important concern in computer systems, particularly in mobile computers using a battery as a power supply. The Advanced Configuration and Power Interface (ACPI) standard is implemented in computer systems for managing power consumption, the architecture thereof is shown in FIG. 1a.

ACPI is implemented through cooperation of hardware and software. According to the design, power management is accomplished by delivering commands from the operating system to the hardware through drivers and the system management bus (SMBUS), and power consumption is reduced by decreasing the operating voltage and frequency accordingly. FIG. 1a shows a conventional system architecture comprising a software layer 101, a hardware layer 103 and an ACPI layer 112 therebetween. The operating system 104 in software layer 101 comprises an Operating System Power Management (OSPM) API, labeled 106 in the figure. The OSPM 106 is executed to assess utilization of an application 102, and regulate power consumption accordingly. Thus a corresponding power management command is delivered to the ACPI layer 112 through device drivers 108 and ACPI driver 110 and is transmitted to the hardware layer 103 through SMBUS.

The ACPI layer 112 architecture comprising programs, control tables and ACPI registers resides between the hardware and software layers. In hardware layer 103, the power management command is received by the South Bridge 124, and is transferred to voltage controller 122 and frequency controller 126 through System Management Bus (SMBUS) 128 to control voltages and frequencies. Based on the power management command, the voltage controller 122 can adjust operating voltages of Central Processing Unit (CPU) 114, Accelerated Graphics Port (AGP) 116 and memory 120, and the frequency controller 126 generates corresponding operating frequencies for each of the system components.

When hardware performance is decreased to reduce power consumption, however, the software driven power management efficiency is compromised and reliability suffers as the software is reliant on hardware for execution. For example, when CPU 114 enters state C3, data in CPU 114 is lost, data in the cache loses consistency, and the system is unable to handle master requests and interrupt requests. A considerable number of clock cycles are required to recover from the state C3, thus the software power management system is unable to reflect hardware utilization in real-time, thus reducing power consumption efficiency.

SUMMARY

An embodiment of the invention provides a real-time power management method. The method comprises the following steps. First, utilization of a system component is assessed through a first unit, and a sideband signal is generated through a second unit according to the utilization and a code table. Thereafter, system component parameters are adjusted by a set of sideband pins based on the sideband signal and a parameter table, wherein the sideband pins are connected to the second unit, for transmitting the sideband signal directly without requiring software control.

The generating step comprises the following steps. First, a utilization load class is classified by the first unit, and the sideband signal is generated through looking up the load class in the code table by the second unit. The code table comprises a plurality of load classes previously defined based on the system specifications. The parameter table can be a voltage table built through software protocols defining voltage parameters corresponding to each load class, or a frequency table defining frequency parameters corresponding to each load class. The system component can be a central processing unit, memory or accelerated graphics port. The first unit is a North bridge, and the second unit is a South bridge.

Another embodiment of the invention provides a real-time power management system, for use in a computer system. The system comprises a first unit, a second unit, a system management bus, a controller and a plurality of sideband pins. The first unit assesses utilization of a system component to obtain load information, and the second unit generates a sideband signal based on the load information. The system management bus delivers power management commands through software protocols, and the controller receives the sideband signal to adjust parameters of the system component. The sideband pins, connecting the second unit and the controller, delivers the sideband signal directly without utilizing software protocols.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 3 is a code table code table 202 according to an embodiment of the invention;

FIG. 4 is a frequency table frequency table 204 according to an embodiment of the invention; and FIG. 5 is a voltage table voltage table 206 according to an embodiment of the invention.

DETAILED DESCRIPTION OF THE INVENTION

A detailed description of the present invention is provided in the following.

As the South Bridge is the key component utilized for system frequency and voltage control, power consumption can be reduced by manipulation thereof, thus an automatic frequency and voltage control mechanism can be added as an extension to perform real-time power management. Active power management via the South Bridge can be more precise and faster than passive software control. Additionally, conventional power management conforming to the system management bus (SMBUS) standard takes at least 0.3 millisecond to deliver a command (assuming that clock rate is 100 kilo-hertz, and the command occupies 30 clock cycles). If simultaneous control of voltage and frequency are required, it takes at least 1 millisecond to accomplish the operation. Consequently, an embodiment of the invention provides sideband pins transferring sideband signals for rapid and automatic control of system frequency and voltage.

Figure 2A:
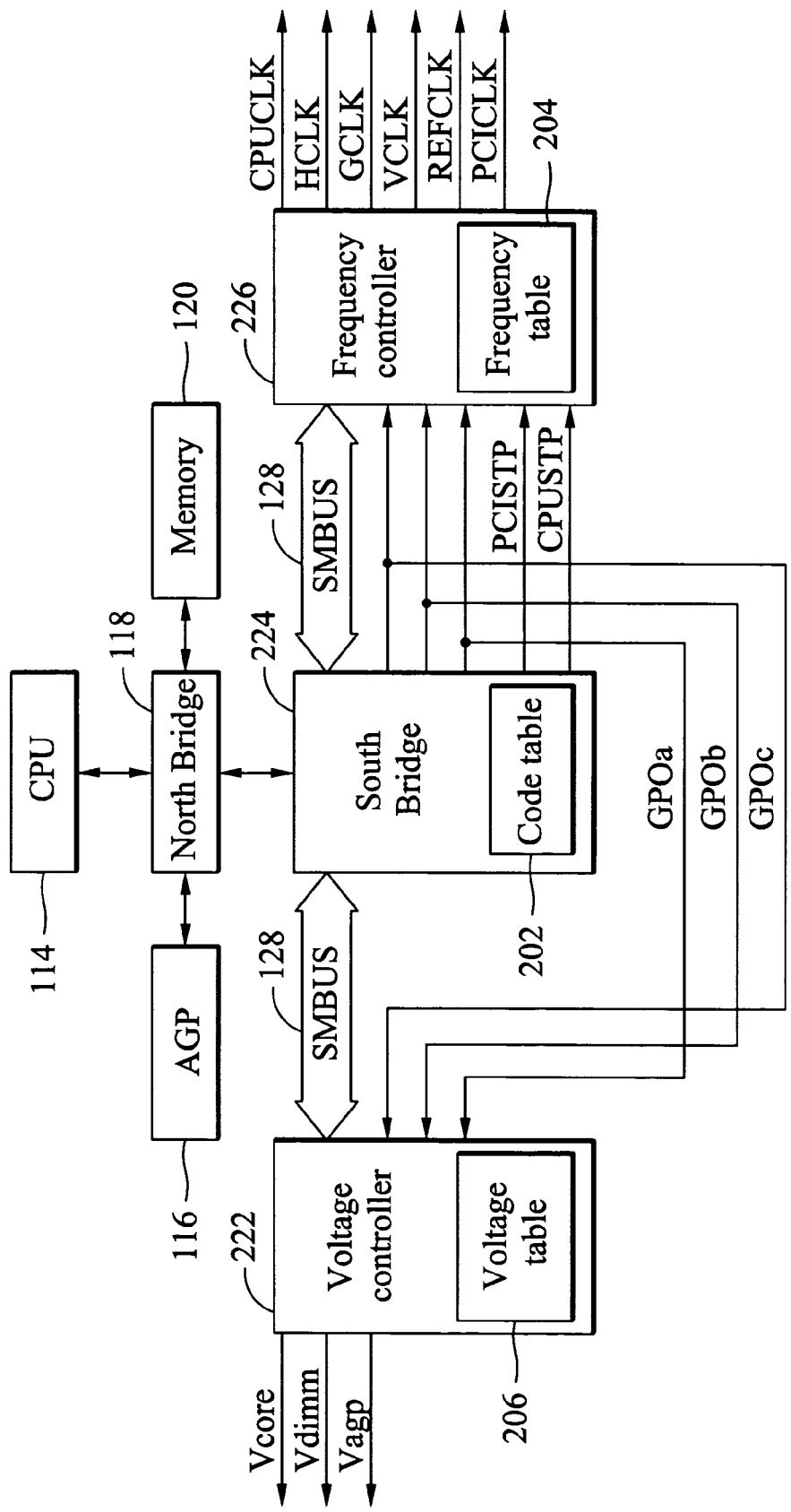
FIG. 2a is a block diagram of power management interface according to an embodiment of the invention.
Figure 2B:
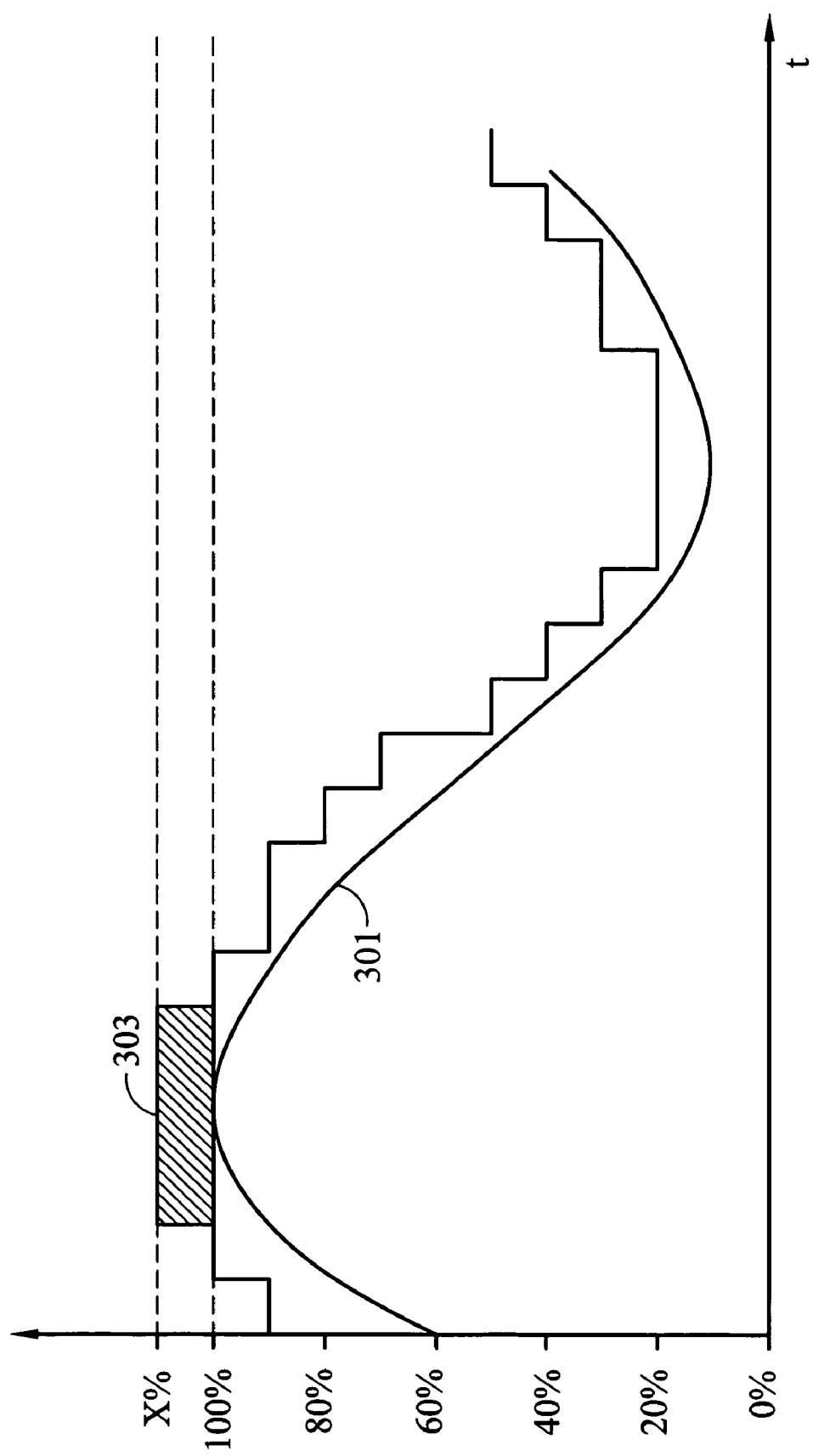
FIG. 2b is a timing chart of power consumption and throttle according to an embodiment of the invention.

The block diagram of an embodiment of the invention as shown in FIG. 2a and FIG. 2b does not correspond to software, instead, a set of registers, code table 202 is added to South Bridge 224 as an extension, for reference of power management. A plurality of sideband pins are extended from South Bridge 224, coupled to voltage controller 222 and frequency table 226, such as GPOa, GPOb and GPOc in FIG. 2a. The number of sideband pins determining the number of load classifications is not limited to the embodiment.

North Bridge 118, among system components, handles load information of CPU 114, AGP 116, memory 120 and South Bridge 224, and further comprises information unknown to CPU 114, making it the most suitable candidate to serve as a system monitor. In this embodiment, utilization information of CPU 114, memory 120 and AGP 116 are obtained by the North Bridge 118 and sent to the South Bridge 224. Through North Bridge 118, the utilization information can be presented as digital values synchronized with corresponding system components in real-time, thus no additional routine functions are required for sampling among numerous data to obtain the utilization information. After the utilization information is transferred from the North Bridge 118 to the South Bridge 224, it is categorized into classes, such as "HIGH", "NORMAL", "LOW", "LOWEST". As shown in FIG. 3, the code table 202 in the South Bridge 224 defines a lookup table indicating which classification corresponds to which signal to output. For example, a combination of GPOa, GPOb and GPOc each having two states, high and low, generates eight variations. The code table 202 is not limited to the described embodiment, and may comprise more detailed lookup tables corresponding to various system components therein. The code table 202 can be generated by the South Bridge 224 automatically according to the system specification when power is on, and can also be manually programmed through an external input. Based on the utilization information from North Bridge 118 and the code table 202 in South Bridge 224, a corresponding sideband signal is generated by the South Bridge 224 and transferred to voltage controller 222 and frequency controller 226 through the sideband pins GPOa, GPOb and GPOc. The voltage controller 222 is capable of tuning operating voltages of CPU 114, AGP 116 and North Bridge 118, and comprises a voltage table 206, as shown in FIG. 5. By referencing voltage table 206, the sideband signals "HIGH", "HIGH" and "HIGH" from GPOa, GPOb and GPOc can be interpreted as increasing the operating voltage by 10%. The voltage controller 222 then increases the operating voltage supplying a corresponding system component by 10%. Conversely, the frequency controller 226 controlling operating frequency of each system component, references the frequency table 204 in FIG. 4 to reduce the corresponding operating frequency by 20% when receiving sideband signals "LOW", "LOW", and "HIGH" from GPOa, GPOb and GPOc, and generates the reduced frequency for the corresponding system component accordingly.

The sideband signals are transferred through sideband pins GPOa, GPOb and GPOc rather than the conventional SMBUS 128 conforming to ACPI standards, thus hardware extension of the South Bridge 224, voltage controller 222 and frequency table 226 are required to penetrate the speed bottleneck. Similar to the code table 202, the frequency table 204 and voltage table 206 can either be generated by system firmware automatically according to the system specification when power is on, or be manually programmed through an external input.

In FIG. 2a, for example, if the ordinary operating voltage of CPU 114 is 3.3 volts and the operating frequency is 2.0 Gigahertz. When the CPU 114 has exceedingly high utilization, the code table 202, frequency table 204 and voltage table 206 are previously defined to increased voltage by 1% and increased frequency by 10%. The North Bridge 118 first detects that the utilization of CPU 114 is 100%, and the detected utilization information is transferred to South Bridge 224 and looked up in the code table 202. A class "HIGHEST" is then determined and corresponding sideband signals are delivered from the South Bridge 224 to the voltage controller 222 and frequency table 226 through GPOa, GPOb and GPOc. After looking up the voltage table 206 and the frequency table 204, the voltage controller 222 applies 3.33 volts to the CPU 114, and the frequency table 226 applies 2.2 Gigahertz to the CPU 114. Therefore, in addition to power management, embodiments of the invention also provide additional performance when necessary.

Figure 1A:
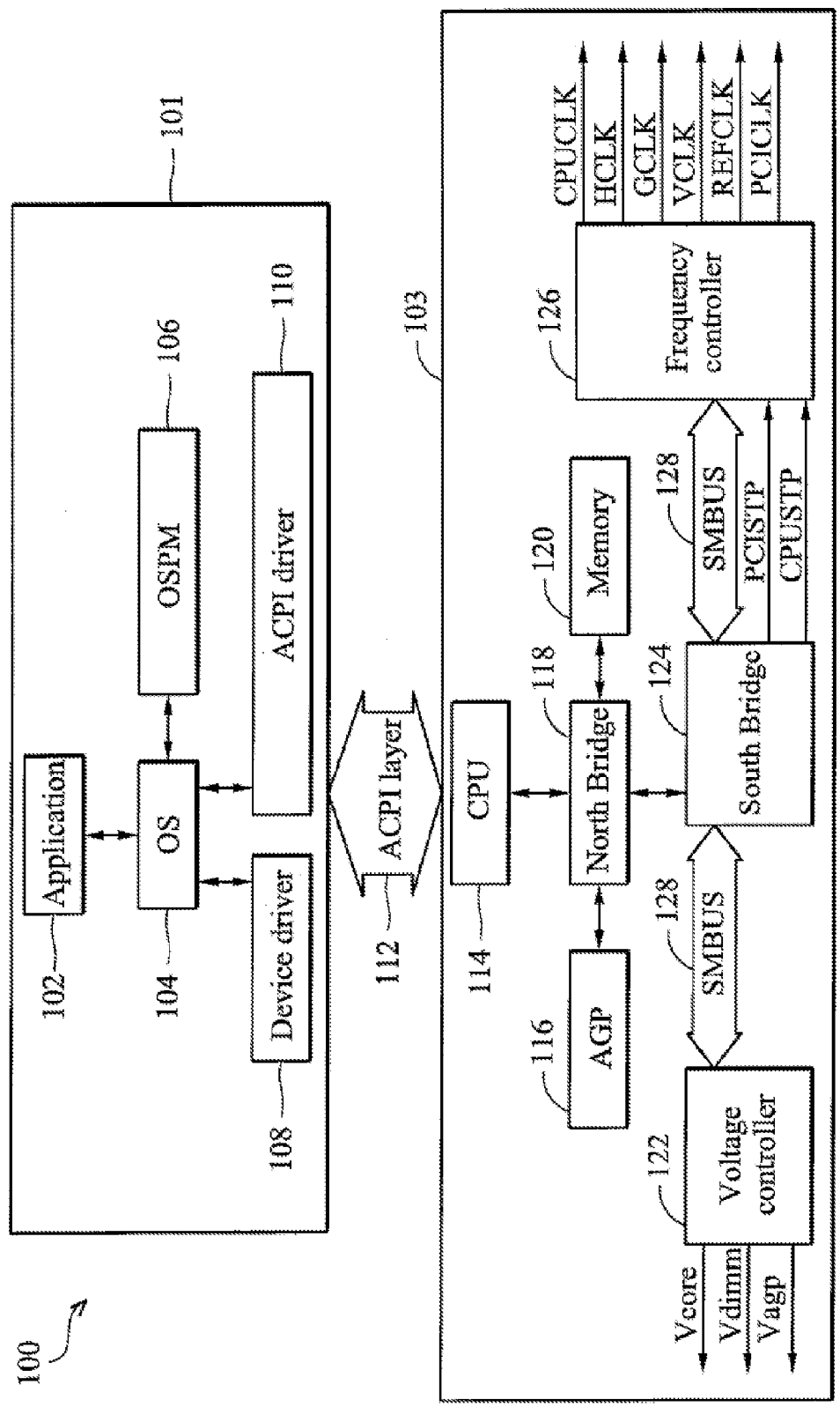
FIG. 1a is a block diagram of conventional power management interface (ACPI)
Figure 1B:
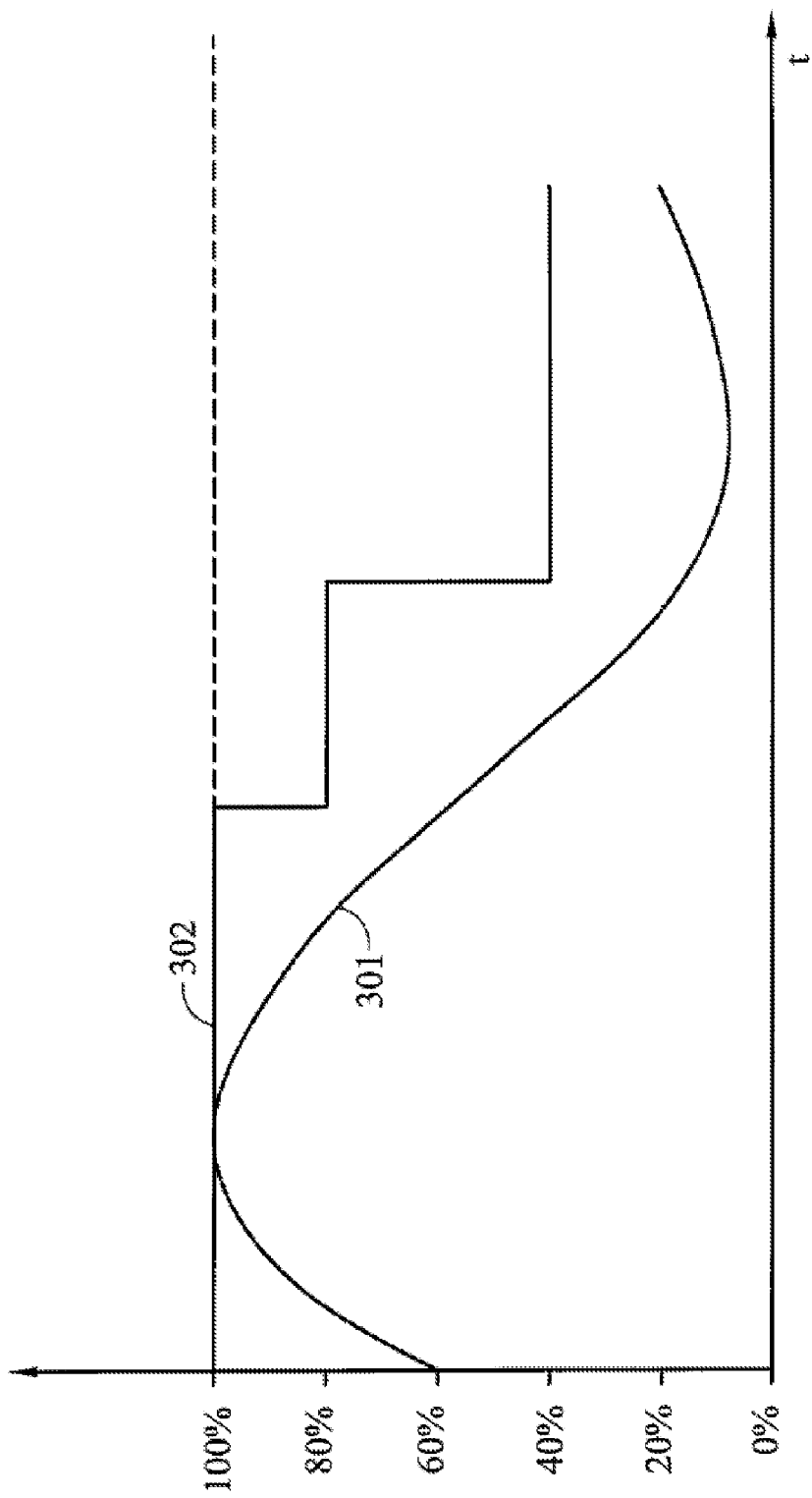
FIG. 1b is a timing chart of conventional power consumption and throttle.

FIG. 1b is a timing chart of a conventional system utilization and throttle. The utilization curve 301 changes with time, and the throttle curve 302 indicates power adjustment under conventional software control. For comparison, FIG. 2b provides a timing chart of an embodiment of the invention that throttles faster and more precisely than the conventional power management system, as the throttle curve 303 shows. When needed, "over-clocking" by x % can be applied to provide additional performance, therefore embodiments of the invention not only reduce power consumption but also maximize hardware performance.

In summary, embodiments of the invention provide a South Bridge 124 comprising a plurality of sideband pins to control voltage and frequency of system components. By cooperating with an internal monitoring mechanism provided by North Bridge 118, and avoiding software inefficiency, the performance of the system is maximized and power consumption is minimized.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A real-time power management method, comprising the following steps:
   actively assessing utilization of a system component through a first unit;
   generating a sideband signal through a second unit according to the utilization and a code table; and
   adjusting parameters of the system component based on the sideband signal and a parameter table via a set of sideband pins;
   wherein the sideband pins are dedicated to connect the second unit and the system component, for transmitting the sideband signal directly without software control.

2. The real-time power management method as claimed in claim 1, wherein the generating step comprises:
classifying a load class of the utilization by the first unit; and
generating the sideband signal through looking up the load class in the code table by the second unit.

3. The real-time power management method as claimed in claim 1, wherein the code table comprises a plurality of load classes previously defined based on the system specifications.

4. The real-time power management method as claimed in claim 3, wherein the parameter table is a voltage table built through software protocols defining voltage parameters corresponding to each load class.

5. The real-time power management method as claimed in claim 3, wherein the parameter table is a frequency table built through software protocols defining frequency parameters corresponding to each load class.

6. The real-time power management method as claimed in claim 1, wherein the system component is a central processing unit, the first unit is a North bridge, and the second unit is a South bridge.

7. The real-time power management method as claimed in claim 1, wherein the system component is memory, the first unit is a North bridge, and the second unit is a South bridge.

8. The real-time power management method as claimed in claim 1, wherein the system component is an accelerated graphics port, the first unit is a North bridge, and the second unit is a South bridge.

9. A real-time power management system, for use in a computer system, comprising:
a first unit, for actively assessing utilization of a system component to obtain load information;
a second unit, for generating a sideband signal based on the load information;
a system management bus, for delivering power management commands through software protocols;
a controller, for receiving the sideband signal to adjust parameters of the system component; and
a plurality of sideband pins, connecting the second unit and the controller, for delivering the sideband signal directly without software protocols.

10. The real-time power management system as claimed in claim 9, wherein the first unit is a North bridge, the second unit is a South bridge, and the system management bus delivers power management commands conforming to the advanced power management standard (ACPI).

11. The real-time power management system as claimed in claim 9, wherein the second unit further comprises a code table previously built based on system specifications.

12. The real-time power management system as claimed in claim 9, wherein the controller is a voltage controller comprising a voltage table, for adjusting voltages of the system component according to the sideband signal.

13. The real-time power management system as claimed in claim 12, wherein the voltage table is previously built by software protocols through the system management bus.

14. The real-time power management system as claimed in claim 9, wherein the controller is a frequency controller comprising a frequency table, for adjusting frequency of the system component according to the sideband signal.

15. The real-time power management system as claimed in claim 14, wherein the frequency table is previously built by software protocols through the system management bus.

* * * * *